H. M. PRUD'HOMME.
METHOD OF AND APPARATUS FOR PRODUCING STEREOSCOPIC MOTION PICTURE FILMS.
APPLICATION FILED MAY 7, 1917.
1,350,836.
Patented Aug. 24, 1920.
2 SHEETS—SHEET 2.
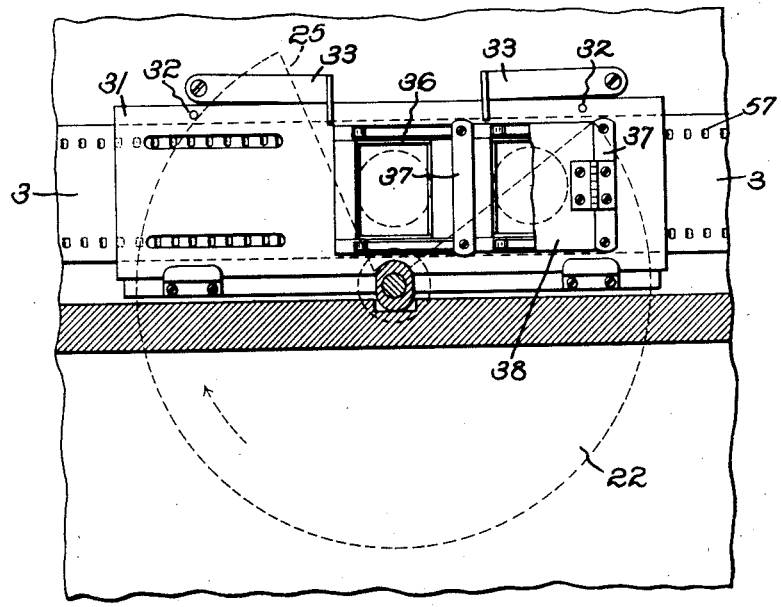
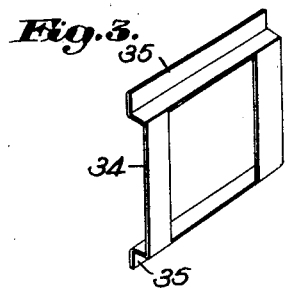
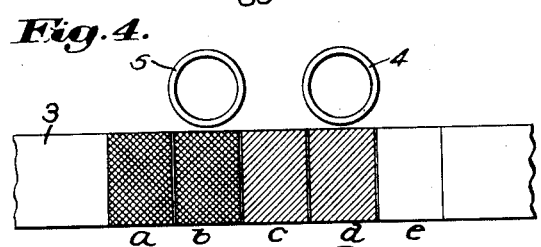
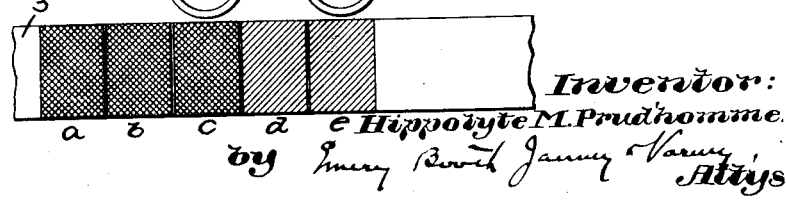

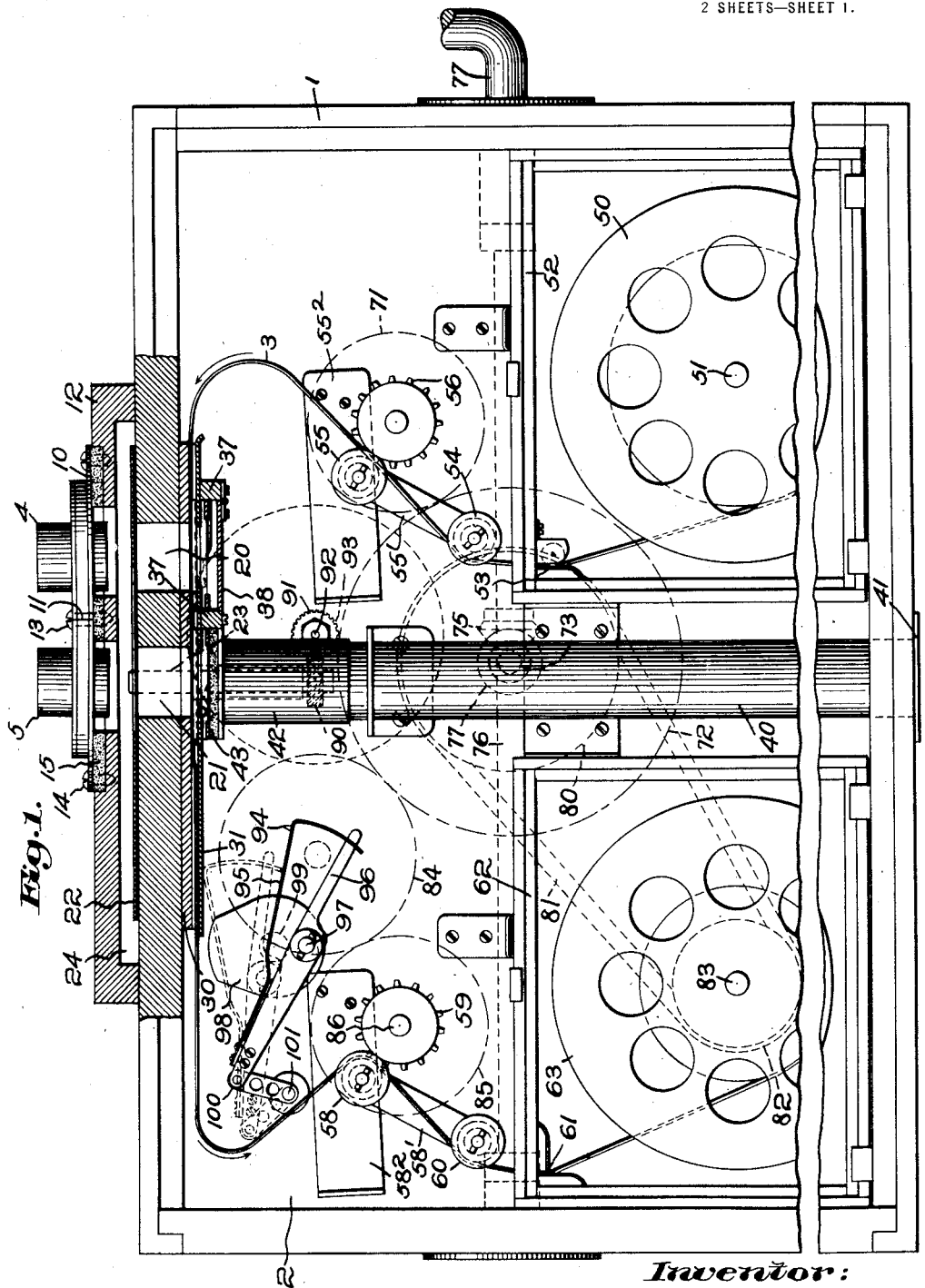

UNITED STATES PATENT OFFICE.

HIPPOLYTE M. PRUD'HOMME, OF BOSTON, MASSACHUSETTS, ASSIGNOR TO LAWRENCE F. SHERMAN, TRUSTEE, OF BOSTON, MASSACHUSETTS.

METHOD OF AND APPARATUS FOR PRODUCING STEREOSCOPIC MOTION-PICTURE FILMS.

1,350,836.  Specification of Letters Patent.  Patented Aug. 24, 1920.

Application filed May 7, 1917. Serial No. 167,058.

*To all whom it may concern:*

Be it known that I, HIPPOLYTE M. PRUD'-HOMME, a citizen of the United States, and a resident of Boston, in the county of Suffolk and Commonwealth of Massachusetts, have invented an Improvement in Methods of and Apparatus for Producing Stereoscopic Motion-Picture Films, of which the following description, in connection with the accompanying drawings, is a specification, like characters on the drawings representing like parts.

This invention relates to the production of moving pictures, the purpose being to produce such pictures in stereoscopic form or, in other words, to give the same effect of perspective relief in the image thrown on the screen, as if the object were viewed along two or more slightly diverging lines of vision.

The invention will be best understood by reference to the following description when taken in connection with the accompanying illustration of one specific embodiment thereof while its scope will be more particularly pointed out in the appended claims.

In the drawings:

Figure 1 is a cross-sectional plan view partly broken away illustrating one apparatus which may be employed for producing a stereoscopic moving picture film in accordance with one form of my invention;

Fig. 2 is a detail in cross-sectional elevation showing the back of the aperture plate;

Fig. 3 is a detail in perspective showing the presser plate; and

Figs. 4 and 5 are diagrams showing the relation of the successive exposures on the film.

Referring to the drawings and to the embodiment of the invention shown therein, while the method may be carried out in various ways and my invention may be embodied in various forms of apparatus, I have shown for the purposes of illustrating the principles of my invention, a camera which consists of a body or casing 1 having a dark chamber 2 and provided with any suitable mechanism for feeding a usual motion picture film 3 across the fields of a plurality of lenses located at 4 and 5. These lenses may be each of any usual or suitable dimensions or construction, such as are customarily employed for motion picture work, but are preferably mounted side by side in a horizontal plane along the path of the film and so arranged that they may be brought to converge upon the same object so as to produce a stereoscopic effect upon the film by effecting respective exposures of the same scene, object or action viewed from different angles.

While I have shown a camera equipped with two lenses for producing two separate exposures upon the film 1, the invention is not limited as to the number of lenses employed, and any number may be availed of, producing separate exposures corresponding in number to the number of lenses or apertures.

Preferably the lenses are adjustably mounted so that their axes may be brought to a point of convergence at varying distances from the camera. Any suitable means for so adjusting them may be employed, but herein they are supported upon a plate 10 which is separated into two parts along a median line 11 and fastened to the lens support 12 by means of a pair of screws 13 passing through the plate along the line of separation 11, and a second pair of screws 14 arranged on a center line at right angles to the line of separation. Between the plate 10 and the support 12 there is provided a gasket 15 of rubber or other yielding material. By tightening up on the screws 13 and loosening on the screws 14, the central part of the gasket may be compressed and the two segments of the plate 10 thrown into angular relation to each other as indicated in Fig. 1 and there maintained. By adjusting the screws this angular relation may be varied within suitable limits as desired, and the lenses adjusted for convergence upon objects at varying distances from the camera.

The film 3 is advanced step by step to bring adjacent portions thereof opposite the apertures 20 and 21 in the camera casing, which apertures are in line with the respective lenses 4 and 5, there being effected at each step an exposure of the film to the two images produced by the lenses. Herein the exposures are effected upon the film at substantially the same instant at each step of film movement by means of a rotary shutter 22 mounted upon the shaft 23 and driven to operate synchronously with the feeding mechanism, the shutter being located at the side of the casing 1 within the chamber 24 provided in the lens support 12. The shutter 22 (see Fig. 2) has a V-shaped opening 25 which serves to alternately open and close the apertures 20 and 21 once for each shutter revolution.

The film in its step-by-step advance is fed past a multiple aperture plate, the latter comprising a front plate 30 having rectangular apertures registering and corresponding to the apertures 20 and 21, and the back plate 31 which fits on dowel pins 32 in the front plate and is held in place by the pivoted catches 33, 33.

The film passes between the front plate 30 and back plate 31, and directly back of the apertures 20 and 21 is firmly held in close and flat relation to the front plate by means of similarly constructed presser plates 34 having upper and lower presser feet 35 which pass through slots in the back of the plate and are pressed into firm contact with the film by means of overlying flat springs 36, one end of each of which is secured to the blocks 37 on the back plate. At the rear of the aperture 20, the aperture in the back plate, the presser plate and the hinges are covered and closed by the hinged door 38 which, however, may be swung back for inspection or adjustment of the film at that point.

The aperture 21 and the registering apertures in the front plate 30 and back plate 31 are in line with a tube 40 which extends through the camera casing and is provided with the exterior, light-proof closure 41 which may be opened to view the image produced on the film through the lens 5 for purposes of observation, finding or focusing. If desired, means for viewing the image produced through the lens 4 may be employed, but for practical purposes a single observation device will usually suffice. The forward end of the focusing tube consists of a section or member 42 adapted to telescopically slide on the main tube 40 and having an annular facing 43 of felt, plush or other light-proof material whereby the section 42 may slide forward into close and light-proof contact with the back aperture plate 31 or slide back out of contact therewith for removal of the back plate or for insertion, inspection or examination of the film.

Any usual or suitable feeding mechanism may be employed for feeding the film. Herein I have shown devices of usual and well known construction. The unexposed portion of the film is carried by a reel 50 mounted to turn upon the pintle 51 within the light-proof casing 52 contained within the camera body. The film passes from the reel 50 through the light-proof slot 53, over an idler 54 and between the idle roll 55 and the toothed feeding sprocket 56, the latter having teeth adapted to enter the usual perforations 57 which are formed in the two margins of the film. From the feeding sprocket 56 the film strip forms a small loop and thence passes through the multiple aperture plate, being pressed into close contact with the front plate by the presser plate 34, and on emergence from the aperture plate passes between the idle roller 58 and the sprocket wheel 59, the latter, like the wheel 60, having a double row of teeth to engage the marginal film apertures 57. From the sprocket wheel 59 the film passes over the idler 60, through the light-proof slot 61 in the casing 62 which contains the used or exposed portion of the film. Within the casing 62 the film passes about a reel 63.

The film is drawn off from the reel 50 by the constant rotation of the sprocket wheel 56, the latter being driven by driving mechanism contained within the compartment below the dark chamber, which driving mechanism is indicated in Fig. 1 in dotted lines.

This driving mechanism includes a gear 71 connected to the shaft of the sprocket-wheel 56, the gear 71 meshing with the gear 72, the latter being mounted on shaft 73 carrying a beveled pinion 74 meshing with a corresponding pinion 75 carried by the horizontal driving shaft 76, which latter may be turned by hand at a constant speed by the exteriorly arranged crank 77. The shaft 73 carries a grooved wheel 80 over which passes a belt 81 to transmit turning movement to a similarly grooved wheel 82 mounted on the upright shaft 83 on which is carried the reel 63. The belt 81 is arranged to slip upon the pulleys 82 when resistance is encountered, so that it will drive the reel 63 fast enough to take up the film fed to it by the sprocket wheel 59 at the beginning of the feeding operation, but will slip more or less, as required, when the wound-on film increases the diameter of the film roll, continuing, however, to maintain the necessary tension on the on-coming film to wind it tightly on the reel.

The sprocket 59 is driven from the gear 72 synchronously with the sprocket wheel 56 by means of the gear 84 which meshes with the gear 72 and also with the gear 85, the latter mounted on the shaft 86 which turns the sprocket wheel 59.

The idle rollers 55 and 58 are carried on swinging arms 55' and 58', by which they may be swung back away from the sprocket wheels, but are normally held in position thereagainst by the spring plates $55^2$ and $58^2$ pressing against their lower ends.

The shutter shaft 23 is rotated by means of the small skew gears 90 and 91, the former mounted on the shaft 23 and the latter mounted on an upright shaft 92 carrying also a small spur gear which meshes with the small spur gear 93, the latter meshing with the large driving gear 72.

To draw the film through the aperture plate with a fixed, certain, intermittent, step-by-step movement, the marginal feeding apertures 57 are engaged by reciprocating teeth 94 carried by spring fingers 95, which latter are mounted upon upper and lower arms 96. The arms are pivoted at 97 upon the eccentric 98, the latter driven by means of a pinion 99 meshing with the gear 84. The rear ends of the arms 96 are secured to a link 100 which is adapted to rock about the pivot 101 so that as the eccentric plate 98 rotates, the arms 96 are swung about the eccentric first to reach forward and insert the teeth 94 firmly into the marginal feeding openings of the film, next to draw the film along to the position indicated by dotted lines in Fig. 1, and then to swing the fingers away to disengage the teeth from the film, the result being to feed the film by a definite amount at each swinging movement of the arms.

The result is to advance the film by a rapid succession of movements, the film being exposed at closely adjacent portions through both lenses between each feeding movement. The proportions of the parts, however, are such that the portion of the film exposed at any one step through the lens 4, is brought into line at an immediate subsequent step with the second lens 5 and in coincidence with the aperture 21, so that the exposure subsequently effected through the lens 5 is superimposed upon the exposure previously effected through the lens 4.

The result is that there is produced a succession of plural exposures of the same object, the exposures of any one set being effected dissimultaneously and from different angles, but superimposed one upon another.

The second exposure through the lens 5 might, if desired, be effected upon that portion of the film which is next contiguous to the one exposed through the lens 4 and at the next step of the film advance, but herein I have so separated the lenses 4 and 5 that any portion of the film exposed through the lens 4 first passes into an intermediate position on the next feeding step before coming into line with the lens 5.

The successive steps on the exposure of the film will be clear from Figs. 4 and 5, wherein there is represented two successive positions of the film. Referring to Fig. 4, the film 3 has been exposed at the portions $c$ and $d$ through the lens 4 and each portion bears a single exposure effected at an angle corresponding to that lens. The portions $a$ and $b$, in addition to carrying similar exposures to those at $c$ and $d$, have also been exposed through the lens 5 and have superimposed thereon exposures effected at an angle corresponding to the lens 5.

At the completion of the next step or movement of the film the condition becomes as represented in Fig. 5, where the film portion $c$ in its advanced position has been exposed through the lens 5 and carries superimposed stereoscopic exposures; the film portion $d$ has passed to the intermediate position and will not be exposed through the lens $e$ until the next position is reached, while the heretofore unexposed film portion $e$ has been exposed through the lens 4.

The film produced by the method described will bear successive sets of superimposed stereoscopic exposures, the exposures of any set, while taken dissimultaneously or at successive steps of the film movement, being taken so near to time coincidence with each other that no intermediate movement of the object photographed will be perceptible to the eye under ordinary conditions.

While I have herein shown and described for the purpose of illustration one specific form of apparatus for carrying into effect the principles of my invention, it is to be understood that the latter is not limited to the precise details of construction herein shown nor to the particular steps herein described for carrying the same into effect, but that extensive deviations may be made therefrom without departing from the spirit thereof.

Claims:

1. The method of producing stereoscopic motion pictures which consists in producing in rapid succession plural motion exposures of the same object side by side upon the same film, the exposures being effected in the same horizontal plane and from different angles, and successively shifting the position of the film relative to the line of exposure to superimpose the exposure from one angle upon a previous exposure from another angle.

2. The method of producing a stereoscopic motion picture film which consists in exposing the film to stereoscopic lenses arranged one by the side of the other in a substantially horizontal plane, producing simultaneously stereoscopic exposures corresponding to each successive step or motion of the picture, feeding the film horizontally step by step and coördinately with said exposures, and advancing the film at each step by a distance sufficient to bring a portion of the film previously exposed through one lens in line with the other lens to superimpose upon the first exposure the exposure through the second lens.

3. The method of producing stereoscopic motion pictures which consists in exposing in rapid succession through a stereoscopic lens successive portions of the film, feeding the film step by step and at each stage of the feeding movement exposing a closely proximate but non-contiguous portion of the film also through a second stereoscopic lens arranged by the side of the first lens but at a different angle being so located as to superimpose on one of the previous exposures taken at one angle the exposure taken immediately following at a second angle.

4. A motion picture camera having a plurality of lenses arranged side by side to produce images of the same scene or object viewed from different angles, means to expose a sensitive film to said images and to advance the film step by step to effect at each step an exposure to said images on adjacent portions of the film, said means serving at each step to bring a film portion already exposed at one angle in line with the exposure at another angle to superimpose the second exposure upon the first, and shutter mechanism to coöperate therewith.

5. A motion picture camera having a plurality of lenses arranged side by side and arranged to be directed at the same object, means for feeding the film to expose adjacent portions of the same to the same object first through one lens and then through the other to superimpose the second exposure upon the first, and suitable shutter mechanism coöperating therewith.

6. A motion picture camera having film feeding mechanism adapted to feed the film step by step, a pair of lenses arranged side by side having their axes inclined and adapted to expose contiguous portions of the same film to the same object from different angles, a multiple aperture plate presenting an aperture registering with each one of the lenses, shutter mechanism to expose said film simultaneously through said apertures at each shift of position thereof, said apertures and lenses being relatively so located as to cause the film's exposure to the said object through the second aperture to be superimposed upon its preceding exposure to the same object through the first aperture, operating devices coöperatively relating said feeding mechanism and said shutter mechanism to produce a rapid succession of motion picture exposures, and means for adjusting the inclination of said lenses.

7. A motion picture camera having film feeding mechanism adapted to feed the film step by step, a pair of lenses arranged side by side and adapted to expose contiguous portions of the same film to the same object from different angles, a multiple aperture plate presenting an aperture registering with each one of the lenses, shutter mechanism to expose said film simultaneously through said apertures at each shift of position thereof, said apertures and lenses being relatively so located as to cause the film's exposure to the said object through the second aperture to be superimposed upon its preceding exposure to the same object through the first aperture, and operating devices coöperatively relating said feeding mechanism and shutter mechanism to produce a rapid succession of motion picture exposures.

8. A motion picture camera having film feeding mechanism adapted to feed the film rapidly step by step, a pair of lenses arranged side by side and adapted to expose contiguous portions of the same film to the same object from different angles, shutter mechanism to expose said film simultaneously to said lenses at each shift of position thereof, said lenses being relatively so located as to cause the film's exposure to the said object through the first lens to be superimposed upon its preceding exposure to the same object through the first lens, and operating devices relating said feeding mechanism and said shutter mechanism to produce a rapid succession of motion picture exposures.

In testimony whereof I have signed my name to this specification.

HIPPOLYTE M. PRUD'HOMME.